(12) United States Patent
Salmia et al.

(10) Patent No.: US 9,621,013 B2
(45) Date of Patent: Apr. 11, 2017

(54) ROTATING MACHINE WITH MAGNETIC BEARING

(71) Applicant: Ingersoll-Rand Company, Davidson, NC (US)

(72) Inventors: Lauri Juhani Salmia, Vantaa (FI); Petri Juhani Maki-Ontto, Espoo (FI)

(73) Assignee: Ingersoll-Rand Company, Davidson, NC (US)

( * ) Notice: Subject to any disclaimer, the term of this patent is extended or adjusted under 35 U.S.C. 154(b) by 335 days.

(21) Appl. No.: 14/214,762

(22) Filed: Mar. 15, 2014

(65) Prior Publication Data
US 2014/0259636 A1 Sep. 18, 2014

Related U.S. Application Data

(60) Provisional application No. 61/801,417, filed on Mar. 15, 2013.

(51) Int. Cl.
*H02K 15/02* (2006.01)
*H02K 7/09* (2006.01)
*F16C 32/04* (2006.01)

(52) U.S. Cl.
CPC .......... *H02K 15/02* (2013.01); *F16C 32/0461* (2013.01); *H02K 7/09* (2013.01); *F16C 32/048* (2013.01); *F16C 32/0476* (2013.01); *H02K 2213/03* (2013.01); *Y10T 29/49012* (2015.01)

(58) Field of Classification Search
CPC F16C 32/0461; F16C 32/0476; F16C 32/048; H02K 15/02; H02K 2213/03; H02K 7/09; Y10T 29/49012
See application file for complete search history.

(56) References Cited

U.S. PATENT DOCUMENTS

| | | |
|---|---|---|
| 710,425 A | 10/1902 | Churchweld |
| 5,708,312 A | 1/1998 | Rosen et al. |
| 5,821,656 A | 10/1998 | Colby et al. |
| 5,844,346 A | 12/1998 | Kolomeitsev et al. |
| 5,998,899 A | 12/1999 | Rosen et al. |

(Continued)

FOREIGN PATENT DOCUMENTS

| | | |
|---|---|---|
| GB | 2260860 | 4/1993 |

OTHER PUBLICATIONS

Schweitzer, G., Maslen, E H., et al., "Magnetic Bearings, Theory, Design and Application to Rotating Machinery," Chapter 3, Hardware Components, Alfons Traxler & Eric Maslen, pp. 69-94, 2009, Springer.

(Continued)

*Primary Examiner* — Minh Trinh
(74) *Attorney, Agent, or Firm* — Taft Stettinius & Hollister LLP

(57) ABSTRACT

A method of manufacturing an electrical machine includes selecting a desired threshold control current, selecting dimensions to modify stator teeth of a magnetic bearing based on the desired threshold control current, and modifying the stator teeth using the selected dimensions. A method of producing a rotating machine includes selecting an operating point of a magnetic bearing of the rotating machine, and shaping at least some stator teeth of the magnetic bearing to generate increased force at control currents above the control current at the selected operating point.

18 Claims, 4 Drawing Sheets

(56) References Cited

U.S. PATENT DOCUMENTS

| | | | |
|---|---|---|---|
| 6,025,668 A | 2/2000 | Kolomeitsev | |
| 6,130,494 A * | 10/2000 | Schob | F16C 32/0463 |
| | | | 310/90.5 |
| 6,249,067 B1 * | 6/2001 | Schob | F16C 32/0446 |
| | | | 310/68 B |
| 6,297,574 B1 | 10/2001 | Schob et al. | |
| 6,700,242 B2 | 3/2004 | Kawamura | |
| 7,939,984 B2 | 5/2011 | Mock | |
| 8,040,007 B2 | 10/2011 | Petrov et al. | |
| 8,179,009 B2 | 5/2012 | Saban | |
| 2010/0019590 A1 | 1/2010 | Guedes-Pinto et al. | |
| 2010/0019598 A1 | 1/2010 | Saban | |
| 2010/0019599 A1 | 1/2010 | Saban | |
| 2010/0019609 A1 | 1/2010 | Stout et al. | |
| 2010/0019613 A1 | 1/2010 | Saban et al. | |
| 2010/0019626 A1 | 1/2010 | Stout et al. | |
| 2014/0363321 A1 * | 12/2014 | Sakawaki | F04D 29/058 |
| | | | 417/423.12 |

OTHER PUBLICATIONS

Zhuravlyov Y., "Active Magnetic Bearings", vol. 37, 1992, pp. 24-37., Laboratory of Electromechanics, Helsinki University of Technology, Espoo, Finland.

\* cited by examiner

# ROTATING MACHINE WITH MAGNETIC BEARING

CROSS REFERENCE TO RELATED APPLICATIONS

The present application claims benefit of U.S. Provisional Patent Application No. 61/801,417 filed Mar. 15, 2013, entitled RADIAL MAGNETIC BEARING STATOR TOOTH, which is incorporated herein by reference.

FIELD OF THE INVENTION

The present invention relates to rotating machines, and in particular, to rotating machines with magnetic bearings.

BACKGROUND

Magnetic bearings, such as radial and axial magnetic bearings, both active and passive, are used in rotating machines, including electrical machines, such as motors, generators and motor/generators. Some existing systems have various shortcomings, drawbacks, and disadvantages relative to certain applications. Accordingly, there remains a need for further contributions in this area of technology.

SUMMARY

A unique method of manufacturing an electrical machine includes selecting a desired threshold control current, selecting dimensions to modify stator teeth of a magnetic bearing based on the desired threshold control current, and modifying the stator teeth using the selected dimensions. A unique method of producing a rotating machine includes selecting an operating point of a magnetic bearing of the rotating machine, and shaping at least some stator teeth of the magnetic bearing to generate increased force at control currents above the control current at the selected operating point. The methods are applicable to both radial and axial bearings of any type of rotating machine. Other embodiments include apparatuses, systems, devices, hardware, methods, and combinations for magnetic bearings. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
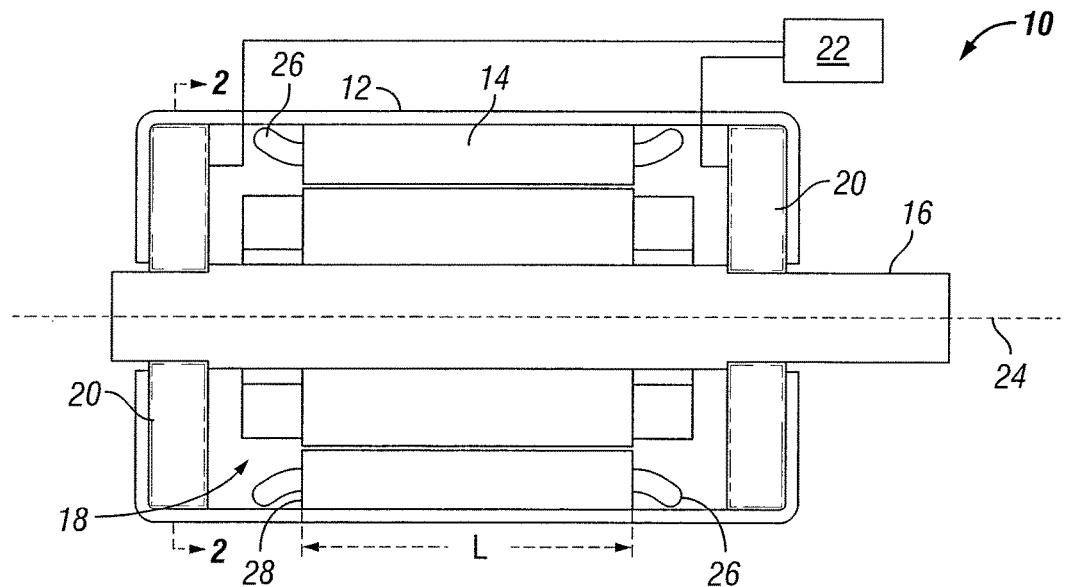
FIG. 1 schematically depicts some aspects of a non-limiting example of an electrical rotor machine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Embodiments of the present invention relate to increasing the radial force in a radial magnetic bearing by modifying the stator tooth shape. Under the same or similar principles, embodiments of the present invention relate to increasing the axial force, e.g., thrust, in an axial magnetic bearing, by modifying the stator tooth shape. In some embodiments of the present invention, the radial and/or axial forces may be increased by modifying the stator tooth shape for both passive and active magnetic bearings. In one form, a modified stator tooth shape optimizes the maximum force capacity of the bearing at a specific maximum magneto-motive force $NI_{max}$. Embodiments of the present invention are suitable for hetero-polar and homo-polar magnetic bearings, regardless of the number of poles, e.g., for use in an electrical machine, such as a conventional or high-speed electric motor, generator or motor/generator application, or for use in other rotating machine applications. The radial forces generated by magnetic bearings are directly proportional to the area $A_\delta$ through which the main magnetic flux flows, and are proportional to the second power of the air-gap magnetic flux density $B_\delta$. In various embodiments of the present invention, the pole shape (stator tooth shape) includes a chamfer, which reduces effective air gap area $A_\delta$ but increases air-gap flux density $B_\delta$ to a greater degree, and hence, the resulting radial force capacity increases. In other embodiments, other shapes may be employed in addition to or in place of a chamfer, for example, tapers or other geometric forms.

Referring to the drawings, and in particular FIG. 1, some aspects of a non-limiting example of an electrical machine 10 in accordance with an embodiment of the present invention are schematically depicted. In one form, electrical machine 10 is an induction motor. In other embodiments, electrical machine 10 may take other forms, e.g., a synchronous machine, such as but not limited to, a permanent magnet machine, an electrically excited synchronous machine and/or a synchronous reluctance machine. Electrical machine 10 includes a casing 12, a stator 14, a shaft 16, a rotor 18 and bearings 20. Casing 12 is configured to house stator 14, shaft 16, induction rotor 18 and radial magnetic bearings 20. In one form, magnetic bearing 20 is an active magnetic bearing. In other embodiments, magnetic bearing 20 may be a passive magnetic bearing. In one form, bearings 20 are mounted in casing 12, e.g., an end plate of casing 12.

In other embodiments, bearings 20 may be mounted and coupled to casing 12 via one or more other structures. Bearings 20 are structured to radially support induction rotor 18. In some embodiments, bearings 20 may also be structured to react inductor rotor 18 thrust loads, e.g., magnetically or mechanically, whereas in other embodiments, other bearing systems or features may be employed to react inductor rotor 18 thrust loads. In one form, bearings 20 are operated by a bearing controller 22, which selectively controls current flow into bearing 20 windings. Shaft 16 and rotor 18 rotate about an axis of rotation 24 defined at least in part by bearings 20.

Stator 14 includes a plurality of stator windings 26 and a stator core 28. Rotor 18 is disposed radially inward of stator core 28. In one form, stator 14 circumferentially encompasses rotor 18, although in other embodiments, stator 14 may only partially encompass rotor 18 e.g., may be in the form of segments that are circumferentially spaced apart around stator 14. Induction rotor 18 is configured for electromagnetic cooperation with stator 14, e.g., to convert electrical power into mechanical power for delivery via shaft 16 in some embodiments and/or to convert mechanical power received from shaft 16 into electrical power for delivery via stator 14 in other embodiments.

Figure 2:
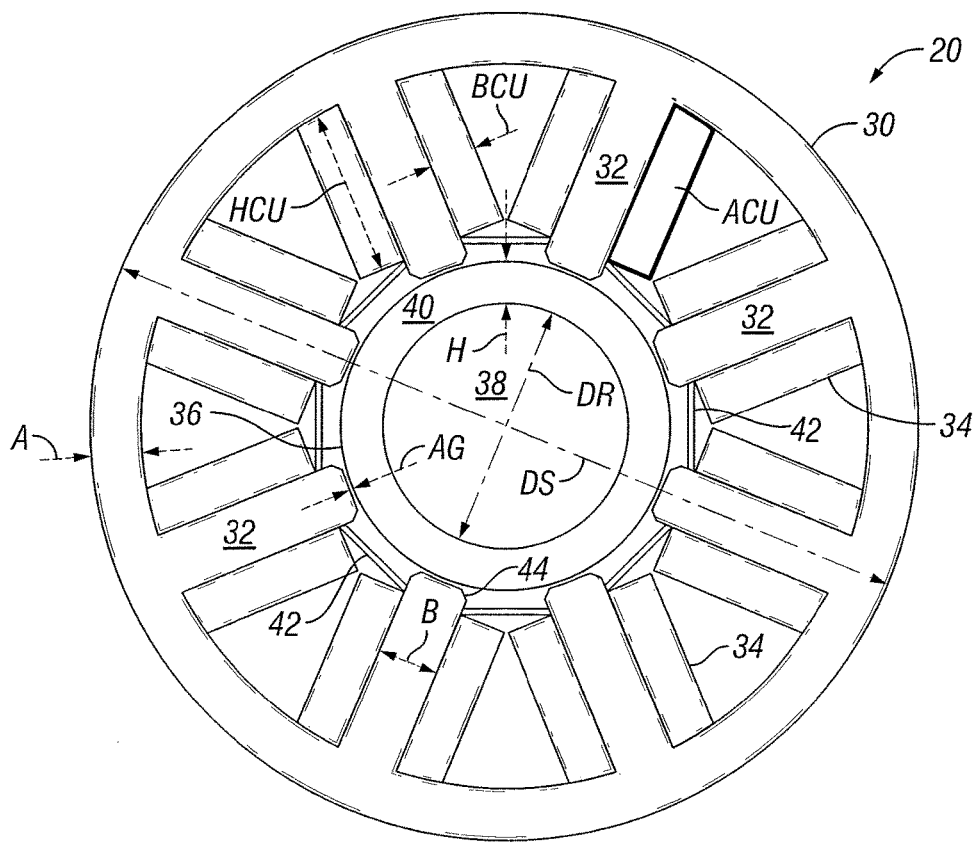
FIG. 2 is a cross-section illustrating some aspects of a non-limiting example of a magnetic bearing in accordance with an embodiment of the present invention.
Figure 3:
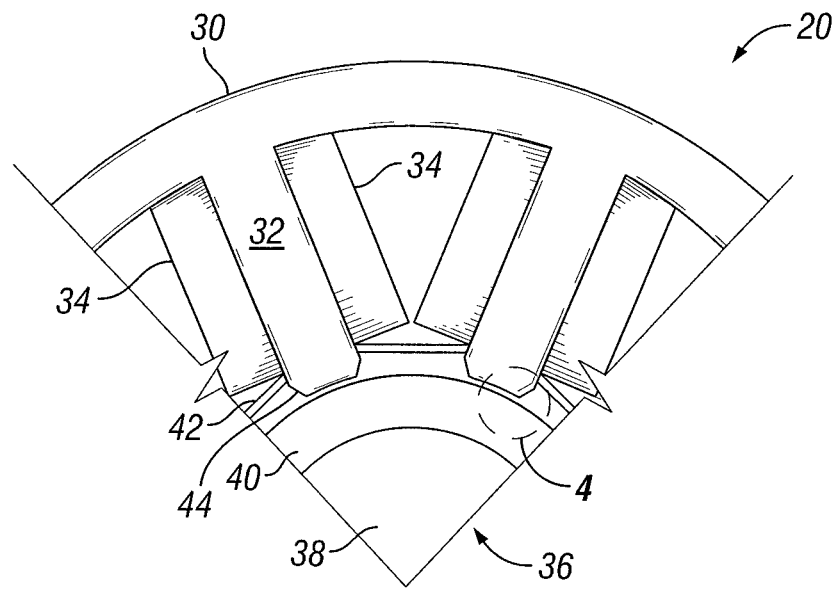
FIG. 3 is an enlarged view of a portion of the magnetic bearing of FIG. 2.
Figure 4:
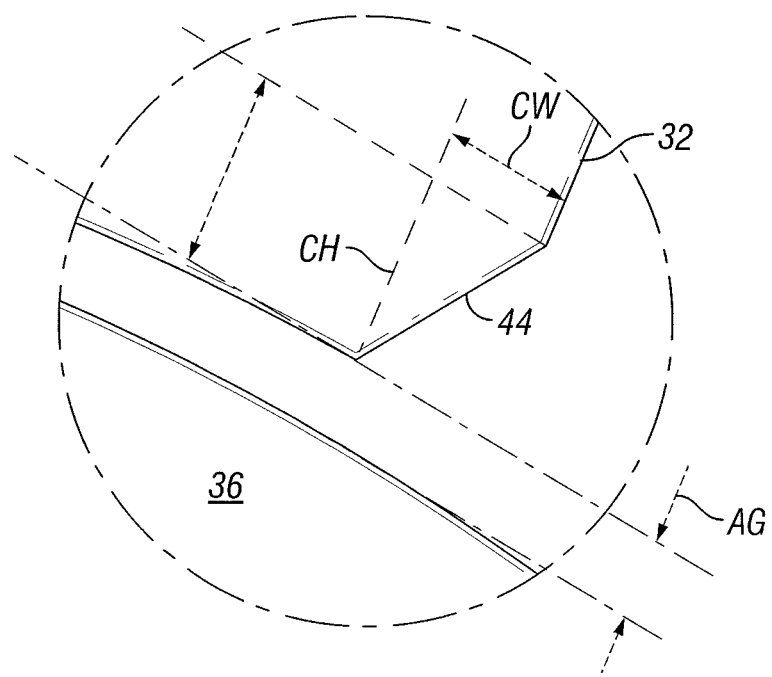
FIG. 4 illustrates a non-limiting example of some dimensions of a modified stator tooth in accordance with the embodiment of FIGS. 2 and 3.

Referring to FIGS. 2-4, some aspects of a non-limiting example of radial magnetic bearing 20 in accordance with an embodiment of the present invention are schematically depicted. Bearing 20 includes a stator 30 having a plurality of stator teeth 32, a plurality of stator windings 34, a rotor 36 having a core 38 and a laminated portion 40 surrounding core 38, and a plurality of slot wedges 42. Slot wedges 42 mechanically retain windings 34, and may be formed of a non-magnetic and non-electrically conductive material.

In one form, stator 30 is laminated, i.e., formed of a plurality of laminations, in order to reduce the amount of electromagnetic losses, e.g., eddy current losses, for example, during rapid changes in current flow in windings 34. In other embodiments, stator 30 may not be laminated, but rather, may use other means of controlling or reducing eddy current losses. In one form, rotor 36 is laminated, i.e., includes laminated portion 40 formed of a plurality of laminations, in order to reduce the amount of electromagnetic losses, e.g., eddy current losses. In other embodiments, rotor 36 may not be laminated or may not include a laminated portion 40, but rather, may use other means of controlling or reducing eddy current losses. In still other embodiments, laminations or other means for controlling eddy current losses may not be employed.

In one form, portions of shaft 16 function as rotors 36 for bearings 20. In other embodiments, rotors 36 may be separate and distinct from shaft 16, e.g., rotors 36 may be attached to, mounted on or otherwise coupled to shaft 16. In one form, core 38 of rotor 36 is solid. In other embodiments, core 38 may be hollow, e.g., depending upon the needs of the particular application. Bearing 20 is sized or optimized for particular applications based on a variety of parameters, for example, boundary conditions such as radial force requirements, spatial constraints, weight constraints, operating speed parameters, such as operating speed range or a maximum or other operating speed point, and material properties. The design of bearing 20 depends, for example, upon the goal(s) of the sizing or optimization, e.g., minimizing bearing size, maximizing efficiency etc., cost, ease of manufacture and the like. Bearing 20 dimensional parameters that may be varied in order to achieve a particular design goal include, but may not be limited to, dimensions/parameters DR, H, AG, ACU, DS, B, A, HCU and BCU, which are illustrated in FIG. 2 and described below. The load capacity of bearing 20, or the bearing force produced by bearing 20, is proportional to the length L of bearing 20.

DR is the diameter of core 38 of rotor 36. H is a radial height of the laminations or laminated portion 40 of rotor 36. DR and H values may be calculated based on, for example, the maximum rotational speed of rotor 36 and the mechanical properties of the rotor laminations of laminated portion 40 of rotor 36. In some embodiments, the maximum surface speed of rotor laminated portion 40 is a controlling factor, owing to the maximum surface speed that the rotor laminations can withstand without undue stress or life reduction. The rotor journal height H is determined, e.g., based on ensuring that the magnetic flux density in the journal (laminated portion 40) is within desired limits, and that the rotor core 38 has sufficient stiffness required to maintain an acceptable rotor 36 dynamic response, e.g., bend modes, within acceptable limits.

AG is the radial air gap between rotor 36 and stator teeth 32. AG is selected to be as small as practicable (e.g. in the range of 0.4 mm-1 mm as a non-limiting example), taking into account mechanical considerations and limitations, e.g., including manufacturing tolerances, radial force requirements, anticipated rotor oscillations, critical modes, orbit modes, unbalance, etc.

ACU is the winding 34 area, and is determined based on the amount of magnetomotive force MMF needed to produce an air-gap magnetic flux density $B_\delta$ sufficient to generate the desired radial force. MMF is generally calculated as the electrical current, I, multiplied number of turns, N, in the stator winding 34. In some embodiments, the magnetic bearing controller determines the maximum current $I_{max}$, and the machine cooling capacity determines the maximum current density that may be used (current divided by the cross-sectional area of, e.g., the conductor/copper wire employed in winding 34), which in turns determines the cross-sectional area of the conductor. The number of turns (in the stator winding) may then be determined based on achieving the requisite MMF. ACU may be calculated based on the number of turns in winding 34, the cross-sectional area of the conductor, and the appropriate winding fill factor (filling factor).

B is the stator tooth 32 width. A is the stator 30 yoke height, and DS is the stator outer diameter, e.g., the outer diameter of the stator laminations. Dimensions B, A and DS are stator steel sheet (lamination) dimensions that are selected based on preventing the magnetic flux density from exceeding design limits in corresponding parts in the magnetic flux path. Dimensions B, A and DS are also selected based on ensuring that there is sufficient space within stator 30 for a stator winding 34 having the selected or desired winding area ACU.

HCU is the height of the stator winding area ACU, and BCU is the width of the stator winding area ACU. HCU and BCU are readily determined once ACU and the other stator dimensions, e.g., B, A and DS have been determined. In some embodiments, DR, H, AG, ACU, DS, B, A, HCU and BCU may be determined together as part of an iterative calculation process, alone or in conjunction with other modeling methods, e.g., finite element analysis.

In one form, bearing 20 may be optimized in order to maximize the bearing output radial force (load capacity) with a specific admissible maximum magneto-motive force $NI_{max}$, where N is number of turns in winding 34, and $I_{max}$ is maximum current through the conductors in winding 34. The maximum admissible magneto-motive force $NI_{max}$ depends on the winding cross-section area ACU and the axial length L of bearing 20, as well as maximum allowed heat dissipation, which in turns depends on the type and amount of the cooling. In one form, bearing geometry optimization relates to the optimal distribution of the available space between iron (e.g., of the stator laminations) and windings. Maximum admissible magneto-motive force $NI_{max}$ can be generated with different values of N and $I_{max}$, wherein $I_{max}$ is limited by the current/bearing controller hardware. However, in some embodiments, this may not be relevant or may only be partially relevant for purposes of bearing geometry optimization, because variations in the coil design and winding connection enable matching of the magnetic bearings with the power amplifier (current controller/bearing controller). Nonetheless, power amplifiers, e.g., bearing controllers, are preferably sized so that they are able to supply the requisite amount of electrical power to the magnetic bearings.

The embodiments described herein employ an 8-pole hetero-polar radial magnetic bearing as an example. However, various embodiments of the present invention are suitable for hetero-polar and homo-polar active or passive radial magnetic bearings having any number of poles and pole orders (NSNS or NNSS). In addition, in view of the teachings of the present disclosure, it will be readily understood that embodiments of the present invention are equally applicable to axial magnetic bearings. Bearing geometry may be optimized using one or more different techniques. In one example, radial magnetic bearing geometry is optimized by optimizing DR, H, AG, ACU, DS, B, A, HCU and/or BCU so that bearing output force is maximized, with a specific admissible maximum magneto-motive force $NI_{max}$. In view of the teachings of the present disclosure, it will be readily understood that corresponding dimensions and features of an axial magnetic bearing may be similarly optimized so that bearing output force is maximized, with a specific admissible maximum magneto-motive force $NI_{max}$. In one form, this optimization problem may be solved by modeling the magnetic circuit. For example, creating and solving a reluctance network is a relatively fast and simple way to create a magnetic circuit model that may be used for optimization of a magnetic bearing. As another example, finite element analysis (FEA) may be used to obtain more accurate results.

Some parameters are determined readily, e.g., mechanical constraints such as maximum surface speed capability of rotor laminations, and mechanical strength and rotor dynamics considerations may readily be used to determine DR and H. Radial air-gap AG is often chosen to be as small as possible, taking into account mechanical and manufacturability/assembly/dimensional tolerancing aspects, as well as other considerations mentioned above. Within given spatial constraints, stator dimensions may be chosen so that magnetic flux density levels are optimal in selected parts of the magnetic circuit, and so that there is enough room for a winding that has the desired electrical and magnetic properties.

Calculations used in designing radial bearings, e.g., active radial bearings, may take still other forms. For example, in addition to the methodology presented above and throughout the preceding discussion, those skilled in the art might also appreciate the methodology presented by Zhuravlyov (Y. Zhuravlyov, "Active Magnetic Bearings", Report 37, 92p., Espoo, Finland, Helsinki University of Technology, Laboratory of Electromechanics, 1992.), which sets forth calculations that may be employed in performing bearing design. Alternatively, those skilled in the art might also appreciate the methodology presented by Traxler and Maslen (Schweitzer, G., Maslen, H., et all. "Magnetic Bearings, Theory, Design, and Application to Rotating Machinery", Springer, 2009.) which also sets forth calculations that may be employed in performing bearing design.

However, in accordance with some aspects of embodiments of the present invention, bearing 20 design may be further enhanced and optimized beyond that of determining and optimizing bearing geometry using the methodologies described above, e.g., based on optimizing one or more of dimensions DR, H, AG, ACU, DS, B, A, HCU and BCU. In some embodiments, one or more of the aforementioned or other methodologies may first be performed to optimize the basic bearing geometry (e.g., dimensions DR, H, AG, ACU, DS, B, A, HCU and BCU), e.g., to maximize radial force for a given bearing 20 weight, or size or other quantity (i.e., a specific radial force). Next, the radial force may be further increased by modifying or shaping the stator teeth, e.g., as described herein with regard to embodiments of the present invention.

In one approach the additionally increased force capability associated with embodiments of the present invention may be employed to increase the efficiency of the bearing, e.g., because less current may be needed to achieve the initial force capability in some embodiments. This may enable the bearing designer to select a bearing controller with a lower power rating, thus reducing the cost of the bearing system. Another approach may be to decrease the physical size of bearing 20, wherein original maximum bearing force is still maintained, but a smaller bearing size is capable of providing the original radial force in some embodiments of the present invention. Such an approach may yield cost savings. In addition, such an approach may be used to reduce axial length of the bearing, thus allowing a shorter distance between bearings, and thus increasing the critical speeds of the shaft/rotor, which may assist in creating sub-critical machines, and further reducing the cost, since lower rotor/shaft stiffness values and hence smaller radial shaft/rotor dimensions may be used in some such embodiments.

The radial force generated by the radial magnetic bearing is directly proportional to the area $A_\delta$ through which the main magnetic flux flows (e.g., the area of the stator teeth that faces the rotor), and is proportional to the second power of air-gap magnetic flux density $B_\delta$. In one form, the stator pole shape is modified to include a chamfer 44 near the stator tooth 32 tip, which reduces the effective air gap area $A_\delta$, but increases flux density $B_\delta$ in the air-gap, whereby the resulting output radial force increases (e.g., above certain air-gap flux densities and control currents $I_c$, e.g., as disclosed herein), owing to the second power relationship between the radial force and the magnetic flux density $B_\delta$. The optimal dimensions for chamfer 44, e.g., dimensions CH and CW (chamfer 44 radial height and circumferential or tangential width, respectively), may be selected based on the other geometric dimensions of bearing 20, as well as saturation level of the magnetic circuit, and hence, they may vary with the needs of the particular application. In some embodiments, CH and CW may be determined by calculating the radial force for a plurality of combinations of CH and CW, and then selecting the combination of CH and CW that yield the greatest improvement in radial force.

Figure 5:
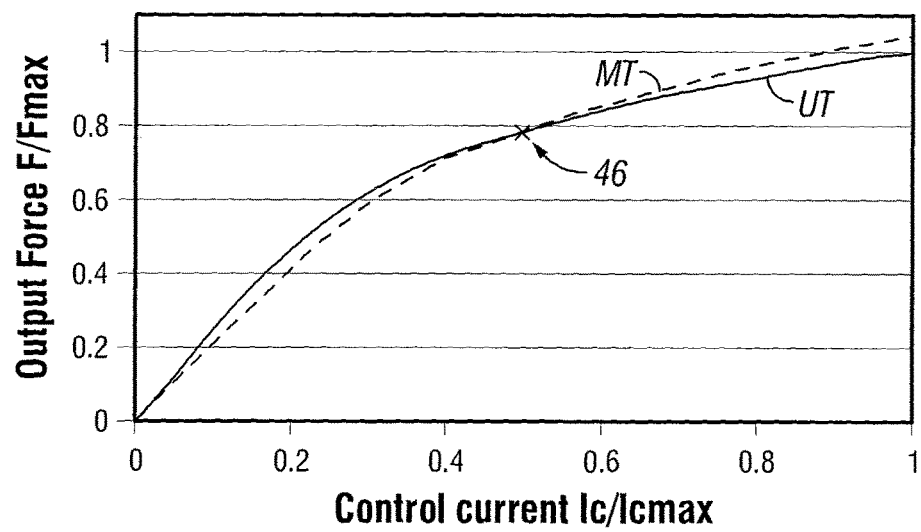
FIG. 5 is a plot depicting a non-limiting example of a normalized output force of a magnetic bearing plotted against a normalized control current for the magnetic bearing.

Referring to FIG. 5, two example curves MT and UT of the output-force as function of control current $I_c$ (the electrical current supplied to windings 34 of bearing 20) are shown. Solid line curve UT represents an original design (stator tooth shape not modified in accordance with the present invention) and dashed line curve MT represents a design wherein stator teeth are modified to include chamfer 44 in accordance with some embodiments of the present invention. Example calculation results, depicted in the curves of FIG. 5, illustrate that, above a threshold control current value 46, the modified stator tooth design produces higher output force values than the original, unmodified design.

Threshold control current 46 defines a stator winding current value above which modified stator teeth generate a greater radial force on the rotor than do unmodified stator teeth. The cross-section point of these two curves, or threshold control current value 46, depends on the saturation level of the magnetic circuit, and it can be modified by changing the chamfer 44 dimensions CH and CW. Thus, chamfer 44 dimensions CH and CW may be selected, e.g., individually selected or selected as a pair, so as to achieve a desired threshold control current value 46. For example, CH and CW may be selected to obtain a desired threshold control current value 46 to the static load point of the bearing, above which certain bearing electromagnets are continuously operating, i.e., electromagnets which levitate the rotor in opposition to gravity, which have a continuous static load that is equal in magnitude to the gravitationally induced rotor load. In some embodiments, it may be desired to modify only those teeth that continuously operate to oppose gravity.

In some embodiments, it may be desirable to modify only some of the stator teeth and leave the rest of the teeth unmodified, e.g., in embodiments wherein lower current consumption is desired under lower load conditions for such unmodified stator teeth. Thus, in various embodiments, a desired threshold control current 46 may be selected, e.g., in order to define an operating characteristic of bearing 20. The operating characteristic may be based on a desired operating condition or operating point of bearing 20, such as a particular operating speed and/or load for which increased bearing 20 radial force output is desired. Chamfer dimensions CH and CW may be selected based the desired threshold control current 46, i.e., selected so as to achieve the desired threshold control current 46. One or more of the stator teeth may then be selected for modification, which may then be modified by incorporating a chamfer 44 on such teeth, wherein the chamfer is formed using the selected chamfer 44 dimensions CH and CW. In the example of FIG. 5, the maximum bearing force is increased 4.4% compared to original design. With the same bearing design used in the example plot of FIG. 5, an even greater 5.5% increase in maximum bearing force may be achieved if threshold control current value 46 is set at higher relative control current values.

Embodiments of the present invention may be utilized in any active or passive, radial or axial magnetic bearing, where the stator construction includes a tooth which is used to conduct the magnetic flux over an air-gap (radial or axial, depending upon the particular embodiment) to a rotor (e.g., including a thrust disc of an axial bearing) and receive the flux back from the rotor with another stator tooth. Accordingly, embodiments of the present invention may be employed in conjunction with any hetero-polar or homo-polar radial magnetic bearing with any pole numbers and pole orders (NSNS or NNSS), as well as in any axial magnetic bearing. Embodiments of the present invention are also suitable to any rotating machine application where magnetic bearings are used.

Figure 6:
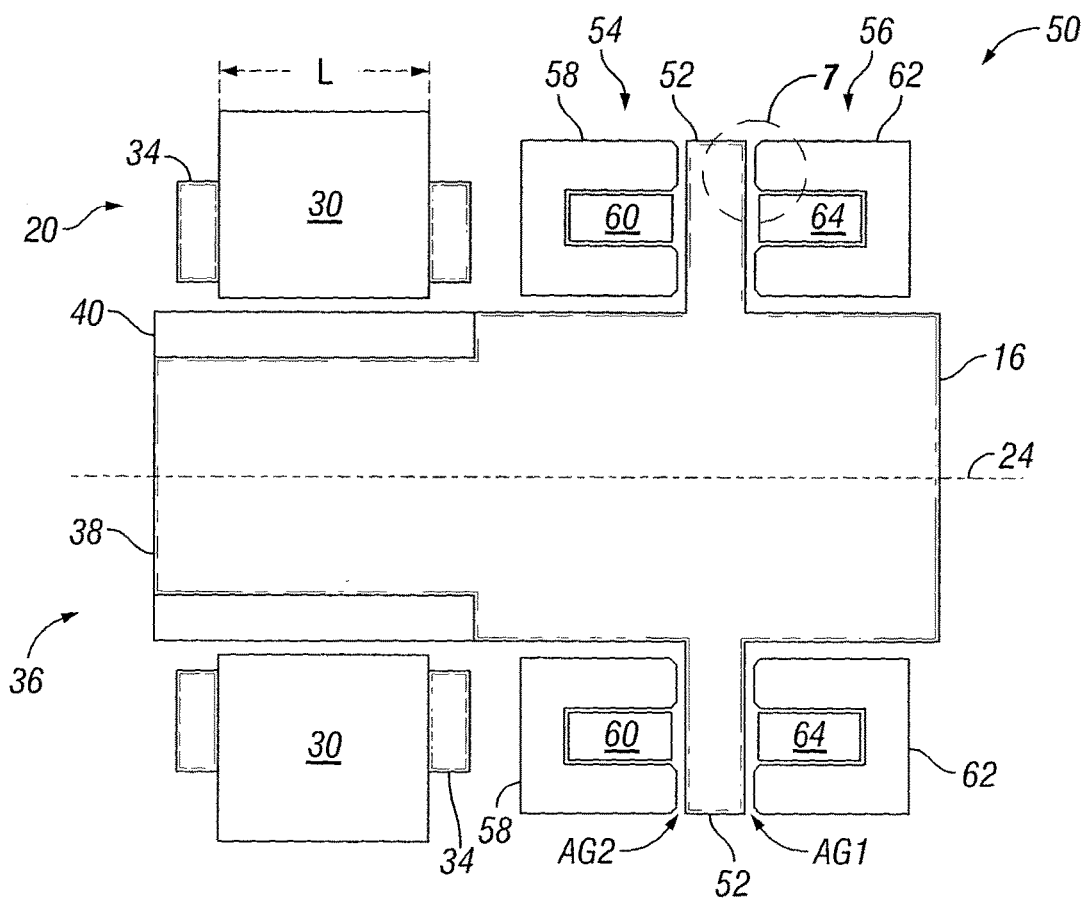
FIG. 6 is a cross-section illustrating some aspects of a non-limiting example of a magnetic bearing in accordance with an embodiment of the present invention.
Figure 7:
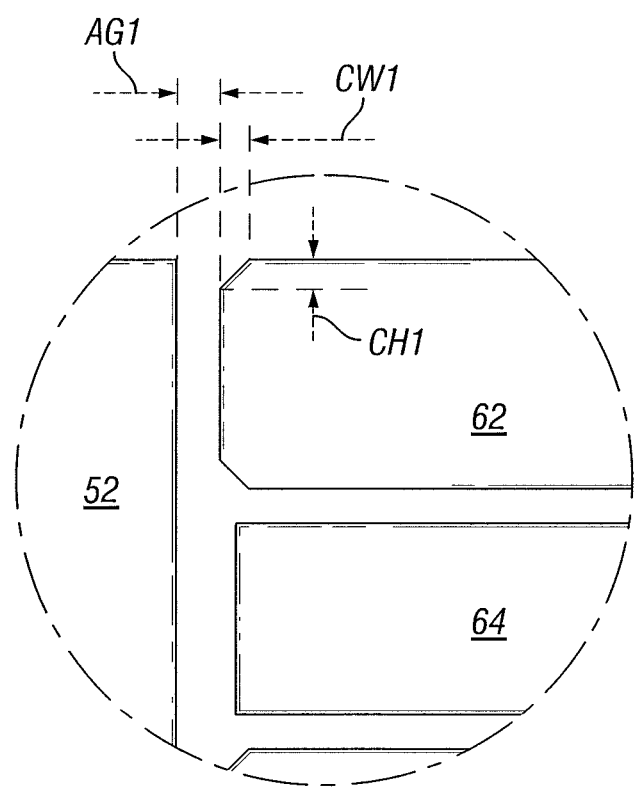
FIG. 7 illustrates a non-limiting example of some dimensions of a modified stator tooth in accordance with the embodiment of FIG. 6.

Referring now to FIGS. 6 and 7, some aspects of a non-limiting example electrical machine 10 in accordance with an embodiment of the present invention are schematically depicted. In the embodiment of FIGS. 6 and 7, electrical machine 10 includes an axial magnetic bearing 50 in addition to radial magnetic bearing 20. In one form, magnetic bearing 50 is an active magnetic bearing. In other embodiments, magnetic bearing 50 may be a passive magnetic bearings. In one form, bearing 50 is mounted to casing 12. In other embodiments, bearing 50 may be mounted to one or more other structures. Bearings 50 is structured to react rotor 18 axial loads, and to position rotor 18 axially. In one form, bearing 50 is operated by bearing controller 22, which selectively controls current flow into bearing 20 windings.

Bearing 50 includes a rotor 52 in the form of a thrust disc, and includes a stator 54 and a stator 56. In one form, rotor 52 extends from shaft 16 and is integral with shaft 16. In other embodiments, rotor 52 may be separate and distinct from shaft 16, e.g., rotor 52 may be attached to, mounted on or otherwise coupled to shaft 16. In one form, rotor 52 is not laminated, and does not employ means of controlling or reducing eddy current losses. In other embodiments, rotor 52 may be laminated, or may employ means of controlling reducing any current losses. Stator 54 and stator 56 are disposed on opposite sides of rotor 52. Stator 54 includes a stator core 58 culminating in inner and outer stator 58 teeth, and includes a winding 60. Stator 56 includes a stator core 62 culminating in inner and outer stator 62 teeth, and includes a winding 64. Stator core 62 teeth are spaced apart from rotor 52, forming an air gap AG1 therebetween, and stator core 58 teeth are spaced apart from rotor 52 on the opposite side, forming an air-gap AG2 therebetween. It will be understood in view of the teachings of the present disclosure that in order to increase the amount of axial force on rotor 52, stator core 62 teeth and stator core 58 teeth may be chamfered at the locations of air gaps AG1 and AG2 in the manner described above and based on the same fundamental principles described above with regard to bearing 20. For example, the chamfer width and height dimensions CH1 and CW1 for each stator tooth may be selected, e.g., individually selected or selected as a pair, so as to achieve a desired threshold control current value, above which the modified stator teeth (e.g., chamfered stator teeth having chamfer dimensions CH1 and CW1) generate a greater axial force on rotor 52 than do unmodified stator teeth. The optimal dimensions CH1 and CW1 may be selected based on the other geometric dimensions of bearing 50, as well as saturation level of the magnetic circuit, and hence, may vary with the needs of the particular application. In some embodiments, CH1 and CW1 may be determined by calculating the axial force for a plurality of combinations of CH1 and CW1, and then selecting the combination of CH1 and CW1 that yield the greatest improvement in axial force.

Embodiments of the present invention include a method of manufacturing an electrical machine, comprising: forming a rotor for a magnetic bearing of the electrical machine; forming a stator for the magnetic bearing, wherein the stator has a plurality of stator teeth separated from the rotor by an air gap; selecting a desired threshold control current, wherein the threshold control current defines a stator winding current value above which modified stator teeth generate a greater force on the rotor than do unmodified stator teeth; selecting a first chamfer dimension based on the desired threshold control current; selecting a second chamfer dimension based on the desired threshold control current; selecting at least some of the stator teeth for modification; and forming the selected stator teeth as modified stator teeth by incorporating a chamfer on the selected stator teeth using the selected first chamfer dimension and the selected second chamfer dimension.

In a refinement, the first chamfer dimension is a height of the chamfer, and wherein the second chamfer dimension is a width of the chamfer.

In another refinement, the method further comprises selecting a desired operating condition, wherein the desired threshold control current is selected based on the desired operating condition of the magnetic bearing.

In yet another refinement, all of the stator teeth are modified stator teeth.

In still another refinement, only some of the stator teeth are modified stator teeth.

In yet still another refinement, only the stator teeth that support the rotor gravity load are modified stator teeth.

In a further refinement, all of the modified stator teeth are formed with the same first chamfer dimension; and all of the modified stator teeth are formed with the same second chamfer dimension.

In a yet further refinement, the method further comprises selecting the first chamfer dimension and the second chamfer dimension from a group of first chamfer dimensions and second chamfer dimensions that also yield the same threshold control current.

In a still further refinement, the magnetic bearing is a hetero-polar and/or homo-polar magnetic bearing.

Embodiments of the present invention include a method of producing an electrical machine, comprising: forming a rotor for a magnetic bearing of the electrical machine; forming a stator for the magnetic bearing, wherein the stator has a plurality of stator teeth separated from the rotor by an air gap; selecting an operating point; and shaping at least some of the stator teeth to generate increased force at control currents greater than a control current at the operating point, wherein the shaped stator teeth generate decreased force at control currents below the control current at the operating point.

In a refinement, the all of the stator teeth are shaped stator teeth.

In another refinement, only some of the stator teeth are shaped stator teeth.

In yet another refinement, at least the stator teeth that support the rotor gravity load are shaped stator teeth.

In still another refinement, the shaping of the stator teeth includes forming a chamfer on the stator teeth.

In yet still another refinement, the control current at the operating point is a desired threshold control current; and the desired threshold control current defines a stator winding current value above which stator teeth having a selected chamfer form generate a greater force on the rotor than do stator teeth without chamfers.

In a further refinement, the method further comprises selecting a first chamfer dimension based on the desired threshold control current; and selecting a second chamfer dimension based on the desired threshold control current.

In a yet further refinement, the method further comprises a bearing controller having a lower current capacity than would be sufficient for normal bearing operation if all stator teeth were not shaped stator teeth.

In a still further refinement, the method further comprises reducing a physical size of the magnetic bearing to achieve the same force in the reduced-size bearing as a bearing of greater physical size but not shaped stator teeth.

Embodiments of the present invention include a method of producing a rotating machine, comprising: forming a rotor for a magnetic bearing of the rotating machine; forming a stator for the magnetic bearing, wherein the stator has a plurality of stator teeth; and wherein the stator teeth are separated from the rotor by an air gap; and a step for modifying the stator teeth.

In a refinement, the step for modifying is based on selecting a desired threshold control current.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method of manufacturing a radial magnetic bearing, comprising:
    forming a magnetic bearing rotor having a plurality of rotor laminations;
    forming a magnetic bearing stator having a plurality of laminations, each lamination having a plurality of stator teeth separated from the rotor by an air gap;
    selecting a desired threshold control current, wherein the threshold control current defines a stator winding current value above which modified stator teeth generate a greater radial force on the rotor than do unmodified stator teeth and below which modified stator teeth generate a lesser radial force on the rotor than do unmodified stator teeth;
    selecting a first chamfer dimension based on the desired threshold control current;
    selecting a second chamfer dimension based on the desired threshold control current;
    selecting at least some of the stator teeth for modification; and
    forming the selected stator teeth as modified stator teeth by incorporating a chamfer on the selected stator teeth using the selected first chamfer dimension and the selected second chamfer dimension.

2. The method of claim 1, wherein the first chamfer dimension is a radial height of the chamfer, and wherein the second chamfer dimension is a circumferential or tangential width of the chamfer.

3. The method of claim 1, further comprising selecting a desired operating condition, wherein the desired threshold control current is selected based on the desired operating condition of the radial magnetic bearing.

4. The method of claim 1, wherein all of the stator teeth are modified stator teeth.

5. The method of claim 1, wherein only some of the stator teeth are modified stator teeth.

6. The method of claim 5, wherein only the stator teeth that support the rotor gravity load are modified stator teeth.

7. The method of claim 1, wherein all of the modified stator teeth are formed with the same first chamfer dimension; and wherein all of the modified stator teeth are formed with the same second chamfer dimension.

8. The method of claim 1, further comprising selecting the first chamfer dimension and the second chamfer dimension from a group of first chamfer dimensions and second chamfer dimensions that also yield the same threshold control current.

9. The method of claim 1, wherein the radial magnetic bearing is a hetero-polar radial magnetic bearing.

10. A method of manufacturing a magnetic bearing, comprising:
forming a toothless magnetic bearing rotor having a plurality of rotor laminations providing an outward facing surface which is round in cross section;
forming a magnetic bearing stator having a plurality of laminations, each lamination having a plurality of stator teeth separated from the rotor by an air gap;
selecting a desired threshold control current, wherein the threshold control current defines a stator winding current value above which modified stator teeth generate a greater force on the rotor than do unmodified stator teeth and below which modified stator teeth generate a lesser force on the rotor than do unmodified stator teeth, the greater force and the lesser force being in one of a radial bearing force and an axial bearing force;
selecting a first chamfer dimension based on the desired threshold control current;
selecting a second chamfer dimension based on the desired threshold control current;
selecting at least some of the stator teeth for modification; and
forming the selected stator teeth as modified stator teeth by incorporating a chamfer on the selected stator teeth using the selected first chamfer dimension and the selected second chamfer dimension.

11. The method of claim 10, wherein the first chamfer dimension is a height of the chamfer, and wherein the second chamfer dimension is a circumferential or tangential width of the chamfer.

12. The method of claim 10, further comprising selecting a desired operating condition, wherein the desired threshold control current is selected based on the desired operating condition of the magnetic bearing.

13. The method of claim 10, wherein all of the stator teeth are modified stator teeth.

14. The method of claim 10, wherein only some of the stator teeth are modified stator teeth.

15. The method of claim 14, wherein only the stator teeth that support the rotor gravity load are modified stator teeth.

16. The method of claim 10, wherein all of the modified stator teeth are formed with the same first chamfer dimension; and wherein all of the modified stator teeth are formed with the same second chamfer dimension.

17. The method of claim 10, further comprising selecting the first chamfer dimension and the second chamfer dimension from a group of first chamfer dimensions and second chamfer dimensions that also yield the same threshold control current.

18. The method of claim 10, wherein the magnetic bearing is a homo-polar magnetic bearing.

* * * * *